(12) United States Patent
Shinohara et al.

(10) Patent No.: US 12,136,192 B2
(45) Date of Patent: Nov. 5, 2024

(54) IMAGE PROCESSING APPARATUS

(71) Applicant: NTT DOCOMO, INC., Chiyoda-ku (JP)

(72) Inventors: Ryo Shinohara, Chiyoda-ku (JP); Naoto Matoba, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 337 days.

(21) Appl. No.: 17/600,261

(22) PCT Filed: May 15, 2020

(86) PCT No.: PCT/JP2020/019459
§ 371 (c)(1),
(2) Date: Sep. 30, 2021

(87) PCT Pub. No.: WO2020/230891
PCT Pub. Date: Nov. 19, 2020

(65) Prior Publication Data
US 2022/0180491 A1 Jun. 9, 2022

(30) Foreign Application Priority Data
May 15, 2019 (JP) .................. 2019-091897

(51) Int. Cl.
*G06T 5/50* (2006.01)
*G06N 3/04* (2023.01)
(Continued)

(52) U.S. Cl.
CPC ............... *G06T 5/50* (2013.01); *G06N 3/045* (2023.01); *G06N 3/082* (2013.01); *G06T 1/20* (2013.01); *G06V 10/16* (2022.01)

(58) Field of Classification Search
CPC .... G06T 5/00; G06T 5/50; G06T 5/60; G06T 5/70; G06T 5/73; G06T 1/20; G06T 3/14;
(Continued)

(56) References Cited

U.S. PATENT DOCUMENTS

2012/0045095 A1* 2/2012 Tate .................. G06T 5/73
382/103
2016/0286138 A1* 9/2016 Kim .................. G06F 18/22
(Continued)

FOREIGN PATENT DOCUMENTS

JP 2017-108387 A 6/2017

OTHER PUBLICATIONS

International Search Report mailed on Aug. 4, 2020 in PCT/JP2020/019459 filed on May 15, 2020 (2 pages).

*Primary Examiner* — Edward F Urban
*Assistant Examiner* — Duy Tran
(74) *Attorney, Agent, or Firm* — Oblon, McClelland, Maier & Neustadt, L.L.P.

(57) ABSTRACT

An image processing apparatus includes an image synthesizer configured to correct input images based on first-correction data to generate corrected images, and to generate a synthesized image by stitching the corrected images together, a determiner configured to determine whether the corrected images are appropriately stitched together in the synthesized image by using a first-trained model learned whether images are appropriately stitched together, a second-correction-data generator configured to generate second-correction data by supplying the input images to a second-trained model learned relationships between correction data used to correct source images to generate corrected images appropriately stitched together and the source images, and an image updater configured to output the synthesized image when a determination result of the deter-
(Continued)

miner is affirmative and output an updated synthesized image generated by causing the image synthesizer to update the synthesized image based on the second-correction data when the determination result of the determiner is negative.

7 Claims, 10 Drawing Sheets

(51) Int. Cl.
*G06N 3/045* (2023.01)
*G06N 3/08* (2023.01)
*G06N 3/082* (2023.01)
*G06T 1/20* (2006.01)
*G06V 10/10* (2022.01)

(58) Field of Classification Search
CPC ........ G06T 2207/20212; G06T 1/0078; G06V 10/00; G06V 10/16; G06V 10/20; G06V 10/80; G06V 40/1335; G06V 30/1906; G06V 30/14; G06V 30/141; G06N 3/045; G06N 3/08; G06N 3/082; G06N 5/00; G06N 20/00
See application file for complete search history.

(56) References Cited

U.S. PATENT DOCUMENTS

| | | | |
|---|---|---|---|
| 2018/0101931 A1* | 4/2018 | Abbas | G06T 3/08 |
| 2018/0262683 A1* | 9/2018 | Meler | G06T 7/13 |
| 2019/0019299 A1* | 1/2019 | Bar | G03B 35/08 |

* cited by examiner

FIG. 5

|  | FIRST IMAGING APPARATUS | SECOND IMAGING APPARATUS | THIRD IMAGING APPARATUS | FOURTH IMAGING APPARATUS | FIFTH IMAGING APPARATUS |
|---|---|---|---|---|---|
| DEVIATION OF CENTER COORDINATE | P11 | P21 | P31 | P41 | P51 |
| DEVIATION OF RADIUS | P12 | P22 | P32 | P42 | P52 |
| DEVIATION OF IMAGE IN X-AXIS | P13 | P23 | P33 | P43 | P53 |
| DEVIATION OF IMAGE IN Y-AXIS | P14 | P24 | P34 | P44 | P54 |
| DEVIATION OF IMAGE IN ROTATION DIRECTION ABOUT Z-AXIS | P15 | P25 | P35 | P45 | P55 |
| DEVIATION IN SIZE | P16 | P26 | P36 | P46 | P56 |

IMAGE PROCESSING APPARATUS

TECHNICAL FIELD

The present invention relates to an image processing apparatus that generates a synthesized image by stitching together input images.

BACKGROUND ART

To generate a 360-degree image, a plurality of images are generated first by cameras having fisheye lenses. Subsequently, the plurality of images are converted into images in an equirectangular projection format (referred to as "converted images" hereinafter). Then, stitching processing is executed to stitch the converted images together. Patent Document 1 discloses an apparatus that executes stitching processing. The apparatus uses a trained model to generate a parameter for the stitching processing. Thereafter, the apparatus executes the stitching processing by using the parameter.

RELATED ART DOCUMENT

Patent Document

Patent Document 1: Japanese Patent Application Laid-Open Publication No. 2017-108387

SUMMARY OF THE INVENTION

Problem to be Solved by the Invention

Conventional apparatuses do not evaluate the quality of images after they have been stitched together. Therefore, people may find the images generated by conventional apparatuses to be unnatural.

Means of Solving the Problem

In order to solve the problem, an image processing apparatus according to preferred modes of the present invention includes an image synthesizer configured to correct input images based on first correction data to generate corrected images, and to generate a synthesized image by stitching corrected images together, a determiner configured to determine whether the corrected images are appropriately stitched together in the synthesized image by using a first trained model having learned whether images are appropriately stitched together in an image in which the images are stitched together, a second correction data generator configured to generate second correction data by supplying the input images to a second trained model having learned relationships between correction data used to correct source images to generate corrected images that are appropriately stitched together and the source images; and an image updater configured to output the synthesized image when a determination result of the determiner is affirmative and output an updated synthesized image generated by causing the image synthesizer to update the synthesized image based on the second correction data when the determination result of the determiner is negative.

Effect of the Invention

According to the present invention, a synthesized image of natural appearance is generated when input images are stitched together.

BRIEF DESCRIPTION OF THE DRAWINGS

FIG. 5 is an explanatory chart illustrating an example of a parameter set included in correction data.

MODES FOR CARRYING OUT THE INVENTION

1. First Embodiment

Figure 1:
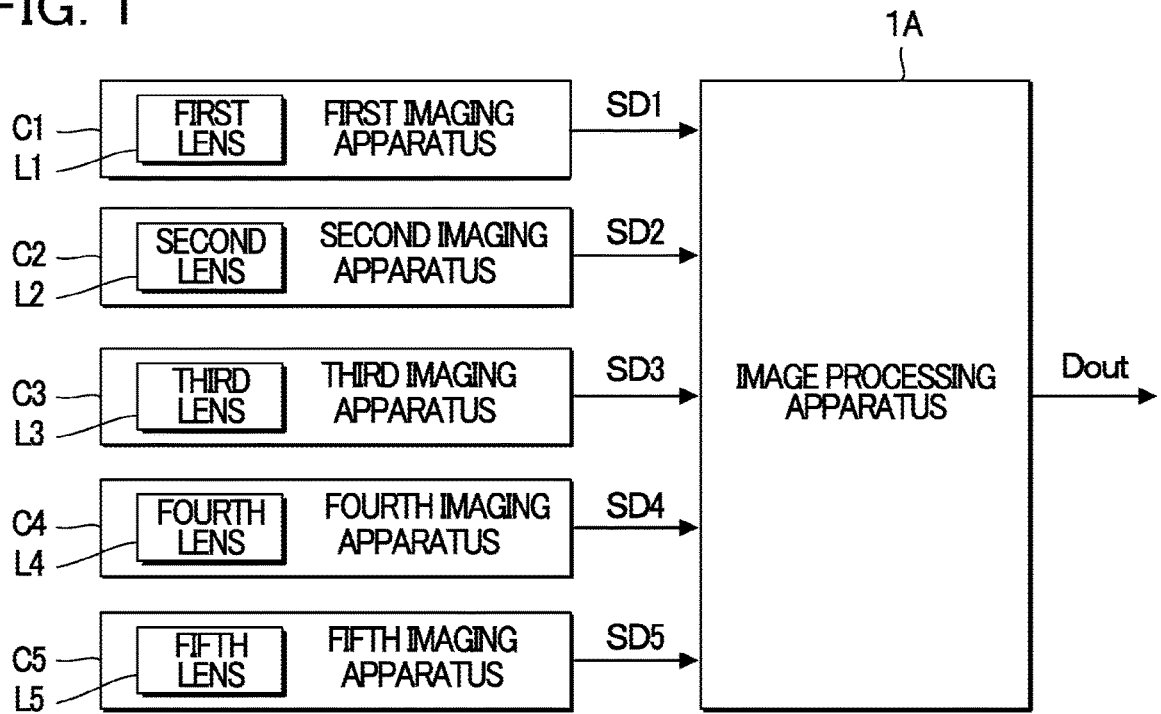
FIG. 1 is a block diagram illustrating an overall configuration of an image processing system according to a first embodiment of the present invention.

FIG. 1 is a block diagram illustrating an overall configuration of an image processing system according to a first embodiment. The image processing system is used to generate a synthesized image in which images are stitched together. The synthesized image is a 360-degree image used in Virtual Reality (VR) or a panorama image, for example.

Figure 2:
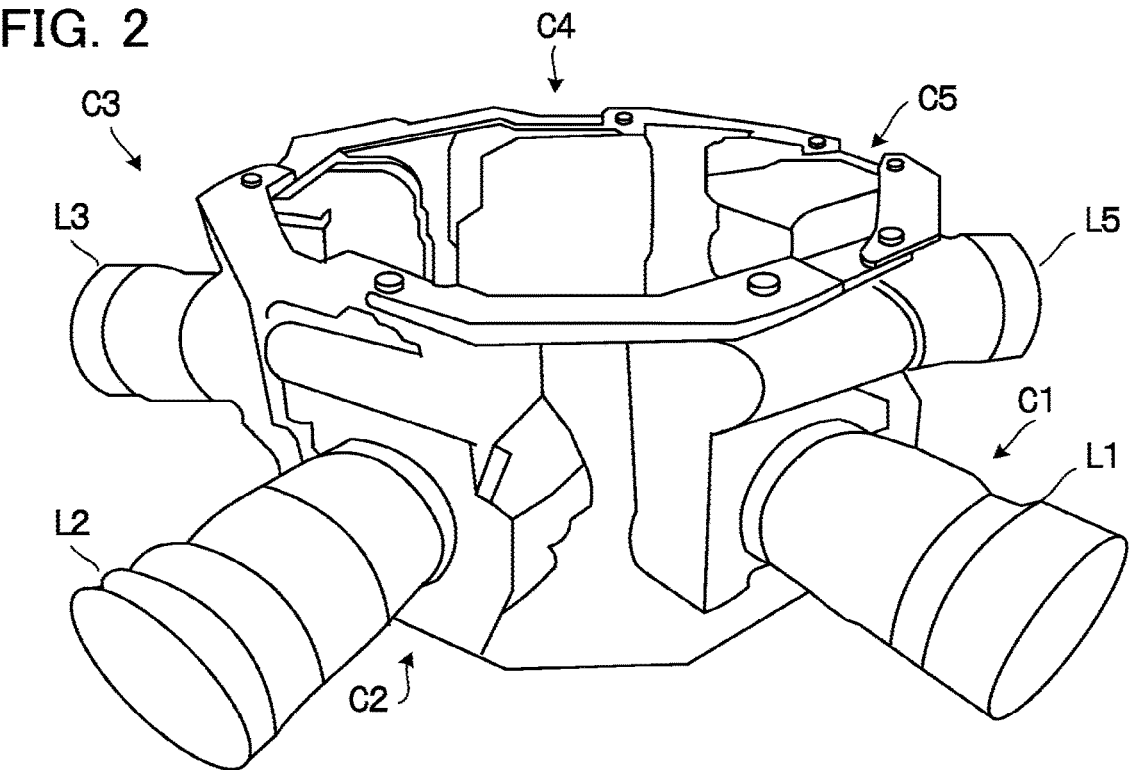
FIG. 2 is a perspective view illustrating layout of a first imaging apparatus C1, a second imaging apparatus C2, a third imaging apparatus C3, a fourth imaging apparatus C4, and a fifth imaging apparatus C5.

The image processing system includes a first imaging apparatus C1, a second imaging apparatus C2, a third imaging apparatus C3, a fourth imaging apparatus C4, a fifth imaging apparatus C5, and an image processing apparatus 1A. FIG. 2 is a perspective view illustrating layout of the first imaging apparatus C1, the second imaging apparatus C2, the third imaging apparatus C3, the fourth imaging apparatus C4, and the fifth imaging apparatus C5. Neighboring imaging directions among the imaging directions of the first imaging apparatus C1, the second imaging apparatus C2, the third imaging apparatus C3, the fourth imaging apparatus C4, and the fifth imaging apparatus C5 form an angle of 72 degrees. The neighboring imaging directions may form an angle different from 72 degrees. The first imaging apparatus C1, the second imaging apparatus C2, the third imaging apparatus C3, the fourth imaging apparatus C4, and the fifth imaging apparatus C5 are examples of imaging apparatuses.

The first imaging apparatus C1 is a camera that is a so-called 4K television camera having a resolution of 2160 pixels high and 3840 pixels wide, for example. Note that the first imaging apparatus C1 is not limited to a 4K television camera. The first imaging apparatus C1 includes a first lens L1. The first lens L1 is a fisheye lens (circumferential fisheye lens). The first imaging apparatus C1 captures an image of a subject through the first lens L1 to generate first image data SD1. The first image data SD1 has a 4K resolution, for example. The first image data SD1 indicates a first input image. Since the first lens L1 is a fisheye lens, the first input image has a substantially circular shape.

The second imaging apparatus C2, the third imaging apparatus C3, the fourth imaging apparatus C4, and the fifth imaging apparatus C5 are cameras such as 4K television cameras. Note that the second imaging apparatus C2, the third imaging apparatus C3, the fourth imaging apparatus C4, and the fifth imaging apparatus C5 are not limited to the 4K television cameras.

The second imaging apparatus C2 includes a second lens L2. The second lens L2 is a fisheye lens (circumferential fisheye lens). The second imaging apparatus C2 captures an image of a subject through the second lens L2 to generate second image data SD2. The second image data SD2 has a 4K resolution, for example. The second image data SD2 indicates a second input image. Since the second lens L2 is a fisheye lens, the second input image has a substantially circular shape.

The third imaging apparatus C3 includes a third lens L3. The third lens L3 is a fisheye lens (circumferential fisheye lens). The third imaging apparatus C3 captures an image of a subject through the third lens L3 to generate third image data SD3. The third image data SD3 has a 4K resolution, for example. The third image data SD3 indicates a third input image. Since the third lens L3 is a fisheye lens, the third input image has a substantially circular shape.

The fourth imaging apparatus C4 includes a fourth lens L4. The fourth lens L4 is a fisheye lens (circumferential fisheye lens). The fourth imaging apparatus C4 captures an image of a subject through the fourth lens L4 to generate fourth image data SD4. The fourth image data SD4 has a 4K resolution, for example. The fourth image data SD4 indicates a fourth input image. Since the fourth lens L4 is a fisheye lens, the fourth input image has a substantially circular shape.

The fifth imaging apparatus C5 includes a fifth lens L5. The fifth lens L5 is a fisheye lens (circumferential fisheye lens). The fifth imaging apparatus C5 captures an image of a subject through the fifth lens L5 to generate fifth image data SD5. The fifth image data SD5 has a 4K resolution, for example. The fifth image data SD5 indicates a fifth input image. Since the fifth lens L5 is a fisheye lens, the fifth input image has a substantially circular shape.

The first input image, the second input image, the third input image, the fourth input image, and the fifth input image are examples of input images.

The image processing apparatus 1A generates output image data Dout based on the first image data SD1 to the fifth image data SD5. For example, the image processing apparatus 1A corrects the first image data SD1 to the fifth image data SD5 to generate a first corrected image CG1 to a fifth corrected image CG5, to be described later. The image processing apparatus 1A generates the output image data Dout that indicates the synthesized image in which the first corrected image CG1 to the fifth corrected image CG5 are stitched together.

1-1. Configuration of Image Processing Apparatus 1A

Figure 3:
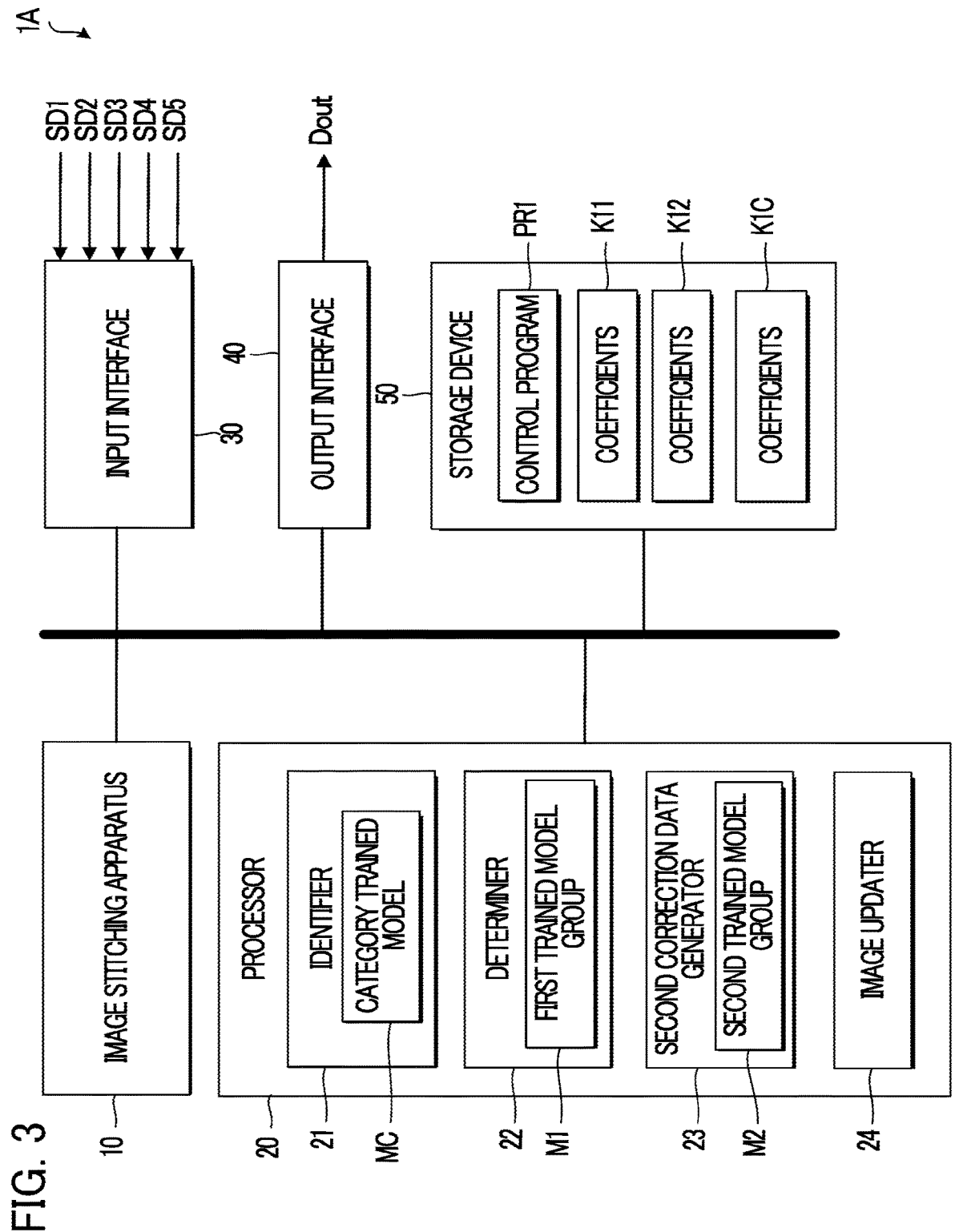
FIG. 3 is a block diagram illustrating a configuration example of an image processing apparatus 1A.

The image processing apparatus 1A is a computer. The image processing apparatus 1A is configured with a workstation, for example. FIG. 3 is a block diagram illustrating a configuration example of the image processing apparatus 1A. The image processing apparatus 1A includes a stitching apparatus (image stitching apparatus) 10, a processor 20, an input interface 30, an output interface 40, and a storage device 50. The input interface 30 receives data from external apparatuses. The output interface 40 transmits data to external apparatuses.

Each element of the image processing apparatus 1A is connected mutually via one or more buses for communicating information. The term "apparatus" in the current description may be replaced with other terms such as circuit, device, or unit. Each of the elements of the image processing apparatus 1A is configured with one or more devices. Some of the elements of the image processing apparatus 1A may be omitted.

The image stitching apparatus 10 is configured with a field-programmable gate array (FPGA), for example. Under control of the processor 20, the image stitching apparatus 10 receives the first image data SD1 to the fifth image data SD5 via the input interface 30. The image stitching apparatus 10 performs stitching processing on the first image data SD1 to the fifth image data SD5 to generate the output image data Dout. The output image data Dout indicates the synthesized image. Under control of the processor 20, the output interface 40 outputs the output image data Dout to the external apparatus. While one piece of the output image data Dout is illustrated in this example, the image stitching apparatus 10 may generate a plurality of pieces of output image data Dout. For example, in a case in which projectors project light toward a horizontal or circular projection plane to display a single image, the image stitching apparatus 10 outputs pieces of output image data Dout corresponding to the projectors on a one-to-one basis.

The stitching processing includes correction processing and connection processing. In the correction processing, the image stitching apparatus 10 corrects input images based on correction data supplied from the processor 20 to generate corrected images. In the connection processing, the image stitching apparatus 10 stitches the corrected images together to generate the synthesized image. The stitching processing is executed twice. Hereinafter, the correction data used in the first stitching processing is referred to as "first correction data", and the correction data used in the second stitching processing is referred to as "second correction data". When there is no need to distinguish the first correction data from the second correction data, the first correction data and the second correction data are simply referred to as "correction data". Note that the stitching processing may be executed only once or may be executed more than twice. The image stitching apparatus 10 is an example of an image synthesizer.

Figure 4:
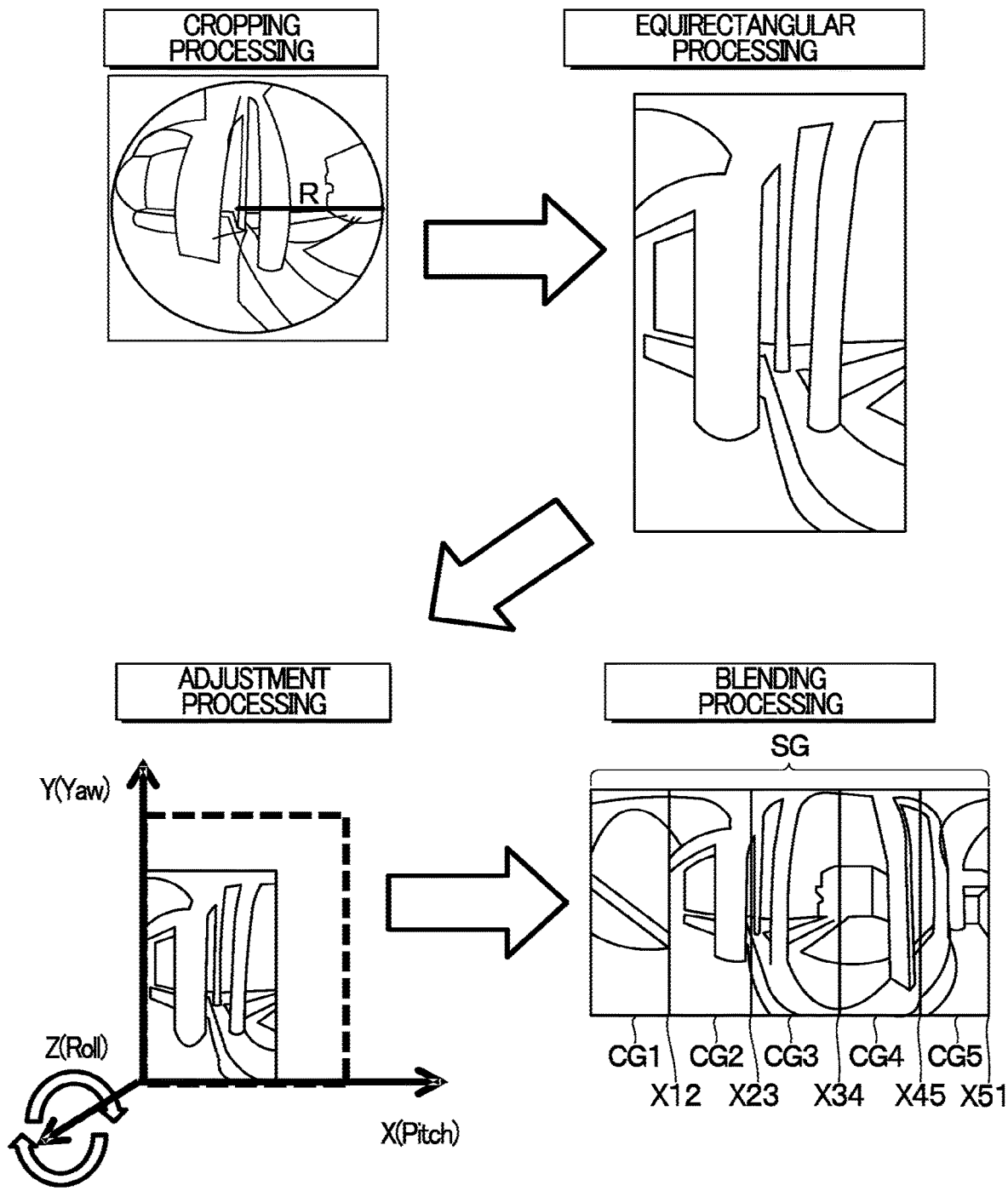
FIG. 4 is an explanatory chart illustrating an example of stitching together processing.

The correction processing includes cropping processing, equirectangular processing, and adjustment processing. The connection processing includes blending processing. FIG. 4 is an explanatory chart illustrating an example of the stitching processing including the correction processing and the connection processing. The image stitching apparatus 10 performs the cropping processing, the equirectangular processing, and the adjustment processing on each of the first input image to the fifth input image to generate the first corrected image CG1 to the fifth corrected image CG5 corresponding to the first input image to the fifth input image on a one-to-one basis. The correction data includes a parameter set used in the cropping processing, the equirectangular processing, and the adjustment processing.

FIG. 5 illustrates the parameter set included in the correction data. The parameter set includes parameters P11 to P16, parameters P21 to P26, parameters P31 to P36, parameters P41 to P46, and parameters P51 to P56. The parameters P11 to P16 relate to the first imaging apparatus C1. The parameters P21 to P26 relate to the second imaging apparatus C2. The parameters P31 to P36 relate to the third imaging apparatus C3. The parameters P41 to P46 relate to the fourth imaging apparatus C4. The parameters P51 to P56 relate to the fifth imaging apparatus C5.

The parameters P11, P21, P31, P41, and P51 each indicate a deviation of a center coordinate generated due to the actual position of an imaging element in the imaging apparatus. The deviation of the center coordinate indicates a difference between the center position of the imaging element in the imaging apparatus as designed and the actual center position of the imaging element in the imaging apparatus. The parameters P12, P22, P32, P42, and P52 each indicate a deviation of a radius generated due to the actual lens. The deviation of the radius indicates a difference between the radius of the lens as designed and the radius of the actual lens. The parameters P13, P23, P33, P43, and P53 each indicate a deviation of an image in the X-axis direction. The deviation of the image in the X-axis direction indicates a difference between the position of the image in the X-axis direction as designed and the position of the actual image in the X-axis direction. The parameters P14, P24, P34, P44, and P54 each indicate a deviation of an image in the Y-axis direction. The deviation of the image in the Y-axis direction indicates a difference between the position of the image in the Y-axis direction as designed and the position of the actual image in the Y-axis direction. The parameters P15, P25, P35, P45, and P55 each indicate a deviation of an image in a rotation direction about the Z-axis. The deviation of the image in the rotation direction about the Z-axis indicates a difference between the position of the image in the rotation direction about the Z-axis as designed and the position of the actual image in the rotation direction about the Z-axis. The parameters P16, P26, P36, P46, and P56 each indicate a deviation in the size of an image. The deviation in the size of the image indicates a difference between the size of the image as designed and the size of the actual image.

As described above, the first input image to the fifth input image are of a circular shape. In the cropping processing illustrated in FIG. 4, the image stitching apparatus 10 first determines the radius and the center of a circle used for cutting out a circular image from each of the first input image to the fifth input image. Then, the image stitching apparatus 10 cuts out the circular image from each of the first input image to the fifth input image by using a circle of which a radius and a center are determined. In the cropping processing, the image stitching apparatus 10 uses the parameters P11, P21, P31, P41, P51 related to the deviation of the center coordinate and the parameters P12, P22, P32, P42, P52 related to the deviation of the radius.

In the equirectangular processing, the image stitching apparatus 10 converts the five circular images generated by the cropping processing into five rectangular images by using the equirectangular projection. In the equirectangular processing, the image stitching apparatus 10 may use a parameter related to distortion of the first lens L1 to the fifth lens L5 in addition to the parameters described above.

In the adjustment processing, the image stitching apparatus 10 finely adjusts the five rectangular images generated by the equirectangular processing to generate the first corrected image CG1 to the fifth corrected image CG5. The adjustment processing includes first processing, second processing, third processing, and fourth processing. In the first processing, the image stitching apparatus 10 uses the parameters P13, P23, P33, P43, and P53 related to the deviation of the image along the X-axis to shift the five rectangular images to the direction along the X-axis. In the second processing, the image stitching apparatus 10 uses the parameters P14, P24, P34, P44, and P54 related to the deviation of the image along the Y-axis to shift the five rectangular images in the direction along the Y-axis. In the third processing, the image stitching apparatus 10 uses the parameters P15, P25, P35, P45, and P55 indicating the deviation of the image in the rotation direction about the Z-axis to rotate the five rectangular images about the Z-axis. In the fourth processing, the image stitching apparatus 10 uses the parameters P16, P26, P36, P46, and P56 related to the size of the image to enlarge or reduce the five rectangular images. The image stitching apparatus 10 executes the first processing to the fourth processing to generate the first corrected image CG1 to the fifth corrected image CG5.

In the blending processing, the image stitching apparatus 10 stitches the first corrected image CG1 to the fifth corrected image CG5 together to generate a synthesized image SG.

Returning to FIG. 3, the processor 20 is a processor that controls the image processing apparatus 1A. The processor 20 is configured with one or more chips, for example. The processor 20 is configured with an interface with peripheral apparatuses, and a central processing unit (CPU), for example. The central processing unit includes an arithmetic unit, a register, and the like. Some or all of the functions of the processor 20 may be implemented by hardware such as a Digital Signal Processor (DSP), an Application Specific Integrated Circuit (ASIC), a Programmable Logic Device (PLD), or a Field Programmable Gate Array (FPGA). The processor 20 executes various kinds of processing in parallel or sequentially.

The storage device 50 is a recording medium that is readable by the processor 20. The storage device 50 stores programs and various kinds of data. The programs include a control program PR1 that is executed by the processor 20. The various kinds of data include coefficients K11 that define a first trained model group M1, coefficients K12 that define a second trained model group M2, and coefficients K1C that define a category trained model MC. The various kinds of data are used by the processor 20 and the like.

In the embodiment, the processor 20 uses the category trained model MC to identify the category corresponding to the type of the content of the synthesized image SG from among the categories related to the types of the content of the image. The categories include sports, scenery, people, and the like, for example.

The category trained model MC has learned relationships between images and the categories by machine learning using category training data TC. The learning result of the category trained model MC is reflected in the coefficients K1C that define the category trained model MC, and the coefficients K1C are stored in the storage device 50. The category training data TC includes a set of category input data TCa and a category label data TCb. The category input data TCa is image data. The category label data TCb indicates the category of the image indicated in the image data that is the category input data TCa. The category trained model MC has learned pieces of category training data TC different from each other, that is, a category training data set. The category trained model MC is an example of a fourth trained model. The category trained model MC is used to determine the category corresponding to the type of the content of the synthesized image SG in an operation phase where the image processing apparatus 1A is operated. When image data is input to the category trained model MC, the category trained model MC outputs category data that indicates the category of the image indicated in the image data.

The first trained model group M1 is configured with first trained models that correspond to the categories on a one-to-one basis. Each of the first trained models has learned whether images configuring an image belonging to the corresponding category are appropriately stitched together by machine learning using first training data T1. A set of the coefficients that are respectively set by the first trained models in machine learning corresponds to "the coefficients K11 that define the first trained model group M1". The first training data T1 includes a set of first input data T1a and first label data T1b. The first input data T1a is composite image data that indicates a composite image in which images are stitched together. The first label data T1b indicates whether the images are appropriately stitched together in the composite image indicated in the first input data T1a. The first training data T1 is classified into one of the categories on the basis of the type of the content of the composite image indicated in the first input data T1a. Each of the first trained models has learned pieces of first training data T1 differing from each other and belonging to the corresponding categories, that is, a first training data set, in a learning phase. In the operation phase, when the composite image data is input to the first trained model, the first trained model outputs data indicating whether the images are appropriately stitched together in the composite image indicated in the composite image data.

The processing for identifying the category of the first training data T1 is preferably executed by using the category trained model MC. When the category trained model MC is used to identify the category of the first training data T1, the processor 20 may use a method of identifying the category in the learning phase as a method of identifying the category in the operation phase. For example, a case may be assumed in which the categories include sports and scenery, and that the content of the connected image in which images are stitched together indicates boat racing. In this case, the content of the connected images may include scenery, in addition to the boat racing. Thus, the connected image indicating the boat racing may correspond to both a category of sports and a category of scenery. When the category trained model MC is used to identify the category of the first training data T1, the first trained model selected in accordance with the synthesized image SG indicating the boat racing in the operation phase is capable of learning the first training data T1 that presents the composite image indicating the boat racing. As a result, in the operation phase, accuracy of determination processing is improved for determining whether the images are appropriately stitched together.

The second trained model group M2 is configured with second trained models that correspond to the categories on a one-to-one basis. Each of the second trained models has learned first image correction data used for generating an image belonging to the corresponding category by machine learning using second training data T2. The first image correction data is used in the correction processing for correcting images (source images) that are the sources of the corrected images to be stitched together into corrected images suitable to be stitched together. A set of coefficients that are respectively set by the second trained models in machine learning corresponds to "the coefficients K12 that define the second trained model group M2". The second training data T2 includes a set of second input data T2a and second label data T2b. The second input data T2a is pieces of image data. The pieces of image data indicate source images. The second label data T2b is the first image correction data (correction data). When the pieces of image data are input to the second trained model, the second trained model outputs the first image correction data (for example, second correction data). The second training data T2 is classified into one of the categories on the basis of the type of the content of the image generated by the stitching processing using the first image correction data. Each of the second trained models has learned pieces of second training data T2 differing from each other and belonging to the corresponding categories, that is, a second training data set, in the learning phase. The processing for identifying the category of the second training data T2 is preferably executed by using the category trained model MC.

Each of the first trained models, each of the second trained models, and the category trained model MC are configured with a support vector machine (SVM), for example.

The storage device 50 is configured with at least one of a Read Only Memory (ROM), an Erasable Programmable ROM (EPROM), an Electrically Erasable Programmable ROM (EEPROM), a Random Access Memory (RAM), a flash memory, and the like, for example. The storage device 50 may also be referred to as a register, a cache, a main memory (main storage device), or the like.

The processor 20 reads out the control program PR1 from the storage device 50. The processor 20 functions as an identifier 21, a determiner 22, a second correction data generator 23, and an image updater 24 by executing the control program PR1. The control program PR1 may be transmitted from another apparatus to the image processing apparatus 1A via a network. In this case, the image processing apparatus 1A includes a communicator that is capable of communicating with the external apparatus via the network.

The identifier 21 identifies the category corresponding to the type of content of the synthesized image SG from among the categories related to the types of the content of the images. The identifier 21 includes the category trained model MC. The identifier 21 identifies the category corresponding to the type of the synthesized image SG from among the categories by using the category trained model MC to which the coefficients K1C are applied. The identifier 21 generates the category data indicating the identified category. The identifier 21 is capable of automatically estimating the category of the synthesized image SG by using the category trained model MC.

The determiner 22 includes the first trained model group M1. The determiner 22 selects one first trained model corresponding to the category identified by the identifier 21 from among the first trained model group M1. The determiner 22 determines whether the corrected images are appropriately stitched together in the synthesized image SG by using the first trained model to which the coefficient K11 corresponding to the one first trained model from among the coefficients K11 is applied. For example, the determiner 22 selects, based on the category data, the first trained model corresponding to the category of the synthesized image SG (referred to as "corresponding first trained model" hereinafter) from among the first trained model group M1. The determiner 22 inputs synthesized image data indicating the synthesized image SG to the corresponding first trained model. The determiner 22 acquires data indicating whether stitching is appropriate from the corresponding first trained model to which the synthesized image data is input.

The second correction data generator 23 includes the second trained model group M2. The second correction data generator 23 selects one second trained model corresponding to the category identified by the identifier 21 from the second trained model group M2. The second correction data generator 23 generates the second correction data corresponding to the input images by using the second trained model to which the coefficient K12 corresponding to the one second trained model from among the coefficients K12 is applied. For example, the second correction data generator 23 selects, based on the category data, the second trained model corresponding to the category of the synthesized image SG (referred to as "corresponding second trained model" hereinafter) from among the second trained model group M2. The second correction data generator 23 inputs the first image data SD1 to the fifth image data SD5 to the corresponding second trained model. The second correction data generator 23 acquires the second correction data from the corresponding second trained model to which the first image data SD1 to the fifth image data SD5 are input.

The image updater 24 supplies the first correction data to the image stitching apparatus 10. The image updater 24 may generate the first correction data based on data regarding captured images acquired from each of the first imaging apparatus C1 to the fifth imaging apparatus C5. The data regarding the captured images is data indicating the performance of the imaging apparatuses or data indicating the performance of the lenses, for example. The image updater 24 may generate the first correction data based on the first image data SD1 to the fifth image data SD5 acquired by capturing the images for calibration by using the first imaging apparatus C1 to the fifth imaging apparatus C5.

When the determination result of the determiner 22 is affirmative, the image updater 24 outputs the synthesized image data indicating the synthesized image SG generated by the image stitching apparatus 10 as the output image data Dout to the outside via the output interface 40.

On the other hand, when the determination result of the determiner 22 is negative, the image updater 24 supplies the second correction data generated by the second correction data generator 23 to the image stitching apparatus 10 to cause the image stitching apparatus 10 to update the synthesized image SG based on the second correction data. The image updater 24 outputs the synthesized image data indicating the synthesized image SG that is being updated (updated synthesized image) as the output image data Dout to the outside via the output interface 40.

1-2. Operations of Image Processing Apparatus 1A

Figure 6:
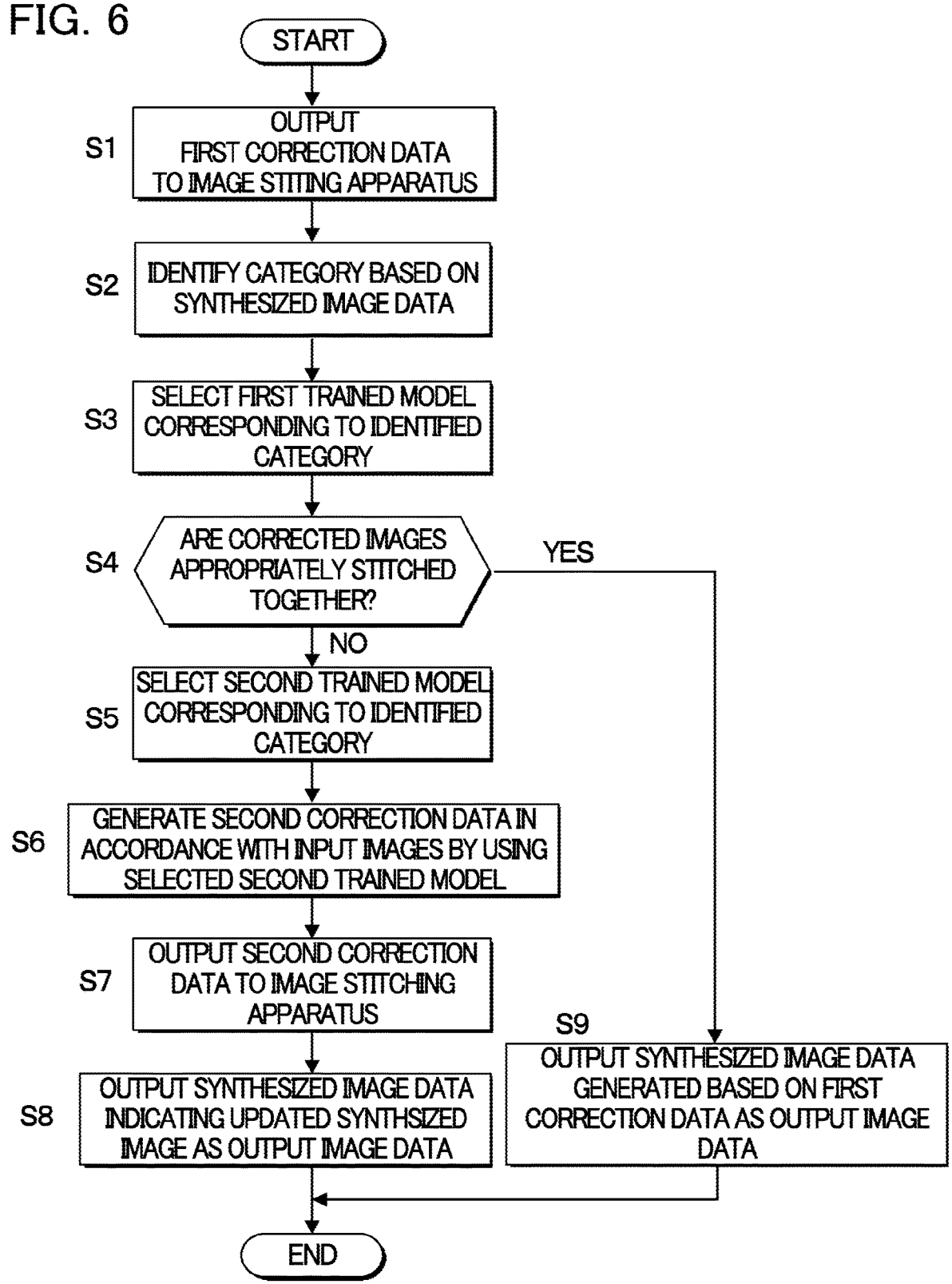
FIG. 6 is a flowchart illustrating an example of an operation of the image processing apparatus 1A.

Next, operations of the image processing apparatus 1A will be described. FIG. 6 is a flowchart illustrating an example of the operations of the image processing apparatus 1A.

At step S1, the processor 20 functions as the image updater 24 to output the first correction data to the image stitching apparatus 10. The first correction data is used for the first stitching processing. Therefore, the first correction data is in the initial values. As a result, the image stitching apparatus 10 generates the first corrected image to the fifth corrected image by correcting the first input image to the fifth input image by using the first correction data. The image stitching apparatus 10 generates the synthesized image SG in which the first corrected image to the fifth corrected image are stitched together.

At step S2, the processor 20 functions as the identifier 21 to identify the category corresponding to the type of the content of the synthesized image SG indicated by the synthesized image data from among the categories. At step S2, the identifier 21 inputs the synthesized image data generated by using the first correction data to the category trained model MC. Subsequently, the identifier 21 identifies the category of the synthesized image SG based on the data output from the category trained model MC. Then, the identifier 21 generates the category data indicating the identification result.

At step S3, the processor 20 functions as the determiner 22. The determiner 22 selects, based on the category data, the first trained model (corresponding first trained model) corresponding to the category identified by the identifier 21 from among the first trained model group M1. At step S4, the processor 20 functions as the determiner 22 to determine whether the corrected images are appropriately stitched together in the synthesized image SG by using the selected first trained model (corresponding first trained model).

When the determination result at step S4 is negative, the processor 20 functions as the second correction data generator 23. The second correction data generator 23 selects, based on the category data, the second trained model (corresponding second trained model) corresponding to the category identified by the identifier 21 from the second trained model group M2 (step S5).

At step S6, the processor 20 functions as the second correction data generator 23 to generate the second correction data in accordance with the input images by using the selected second trained model (corresponding second trained model).

At step S7, the processor 20 functions as the image updater 24 to output the second correction data to the image stitching apparatus 10. The image stitching apparatus 10 updates the synthesized image SG based on the second correction data. The image stitching apparatus 10 generates the synthesized image data indicating the updated synthesized image SG.

At step S8, the processor 20 functions as the image updater 24 to output the synthesized image data indicating the updated synthesized image SG as the output image data Dout.

When the determination result at step S4 is affirmative, the processor 20 functions as the image updater 24 to output the synthesized image data generated by the image stitching apparatus 10 based on the first correction data as the output image data Dout.

According to the embodiment as described above, the image processing apparatus 1A includes the image stitching apparatus 10, the identifier 21, the determiner 22, the second correction data generator 23, and the image updater 24.

The image stitching apparatus 10 corrects the input images based on the first correction data to generate the corrected images, and generates the synthesized image SG by stitching the corrected images together.

The identifier 21 identifies the category corresponding to the type of the content of the synthesized image SG from among the categories regarding the types of the content of the images.

The determiner 22 selects one first trained model corresponding to the category identified by the identifier 21 from among the first trained models that correspond to the categories on a one-to-one basis. The first trained models have each learned whether images are appropriately stitched together in an image. The determiner 22 uses the one first trained model to determine whether the corrected images are appropriately stitched together in the synthesized image SG.

The second correction data generator 23 selects one second trained model corresponding to the category identified by the identifier 21 from among the second trained models that correspond to the categories on a one-to-one basis. The second trained models have each learned relationships between source images and correction data. The second correction data generator 23 inputs the input images to the one second trained model to generate the second correction data.

The image updater 24 outputs the synthesized image SG when the determination result of the determiner 22 is affirmative, and outputs the updated synthesized image by causing the image stitching apparatus 10 to update the synthesized image SG based on the second correction data to generate the updated synthesized image when the determination result of the determiner 22 is negative.

For example, it is assumed that the stitching processing used for generating a synthesized image SG1 in the category of sports is the same as the stitching processing used for generating a synthesized image SG2 in the category of scenery. In this case, distinctiveness of the seams between the images in the synthesized image SG1 in the category of sports is different from distinctiveness of the seams between the images in the synthesized image SG2 in the category of scenery. The image processing apparatus 1A selects the first trained model corresponding to the category of the synthesized image SG from among the first trained models corresponding to the categories on a one-to-one basis. Therefore, the image processing apparatus 1A is capable of determining whether the corrected images are appropriately stitched together in the synthesized image SG for each of the categories.

The image processing apparatus 1A selects the second trained model corresponding to the category of the synthesized image SG from among the second trained models corresponding to the categories on a one-to-one basis. Therefore, the image processing apparatus 1A is capable of generating the second correction data for each of the categories. As a result, when the corrected images are not appropriately stitched together in the synthesized image SG generated in the first stitching processing, the image processing apparatus 1A is capable of updating the synthesized image SG based on the category of the synthesized image SG. Thereby, the quality of the output image data Dout is improved.

2. Second Embodiment

An image processing system according to a second embodiment includes an image processing apparatus 1B instead of the image processing apparatus 1A.

2-1. Configuration of Image Processing Apparatus 1B

Figure 7:
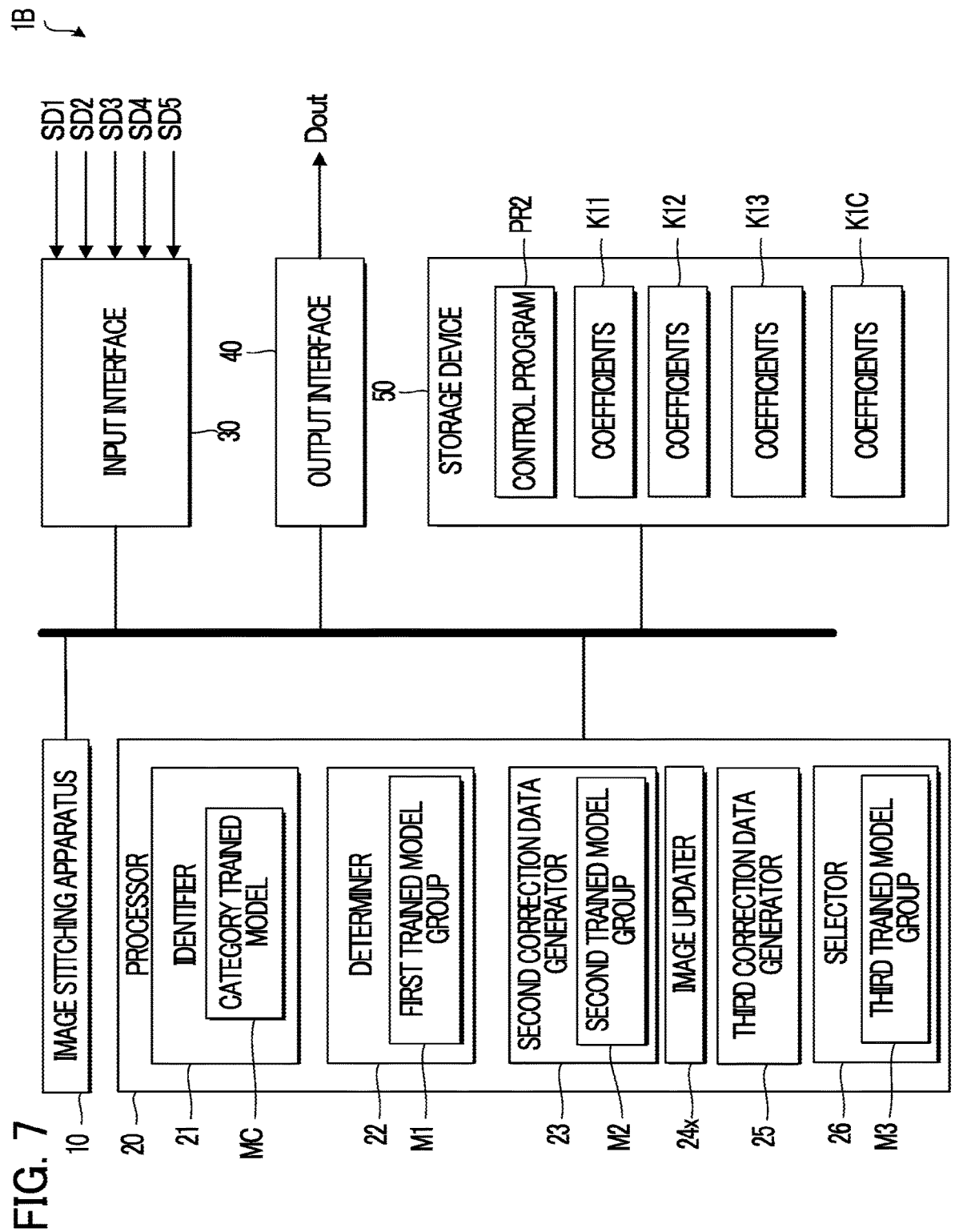
FIG. 7 is a block diagram illustrating a configuration example of an image processing apparatus 1B.

FIG. 7 is a block diagram illustrating a configuration example of the image processing apparatus 1B. The image processing apparatus 1B differs from the image processing apparatus 1A in that a control program PR2 is stored in the storage device 50 instead of the control program PR1 and in that coefficients K13 that define a third trained model group M3 are stored in the storage device 50. In addition, the image processing apparatus 1B differs from the image processing apparatus 1A in that the processor 20 reads out and executes the control program PR2 from the storage device 50. Furthermore, the image processing apparatus 1B differs from the image processing apparatus 1A in that the processor 20 functions as an image updater 24x instead of the image updater 24, that the processor 20 functions as a third correction data generator 25, and that the processor 20 functions as a selector 26.

Hereinafter, the configuration of the image processing apparatus 1B will be described focusing on the differences. The third trained model group M3 is configured with third trained models that correspond to the categories on a one-to-one basis. Each of the third trained models has learned relationships between second image correction data and assessment value indicating appropriateness of stitching of images generated by the correction processing using the second image correction data, by machine learning using third training data T3. A set of the coefficients that are respectively set by the third trained models in machine learning corresponds to "the coefficients K13 that define the third trained model group M3". The third training data T3 includes a set of third input data T3a and third label data T3b. The third input data T3a is a set of images (source images) that are the sources of the corrected images to be stitched together and the second image correction data (correction data). The second image correction data is used in the correction processing for correcting the source images into the corrected images suitable for being stitched together. The third label data T3b indicates the assessment value for the second image correction data. The assessment value indicates appropriateness of the stitching together of the corrected images. When the source images (for example, the input images) and the second image correction data (for example, third correction data, to be described later) are input to the third trained model, the third trained model outputs the assessment value. The third training data T3 is classified into one of the categories on the basis of the type of the content of the image generated by the stitching processing using the second image correction data. Each of the third trained models has learned pieces of third training data T3 differing from each other and belonging to the corresponding categories, that is, a third training data set, in the learning phase. The processing for identifying the category of the third training data T3 is preferably executed by using the category trained model MC.

Figure 8:
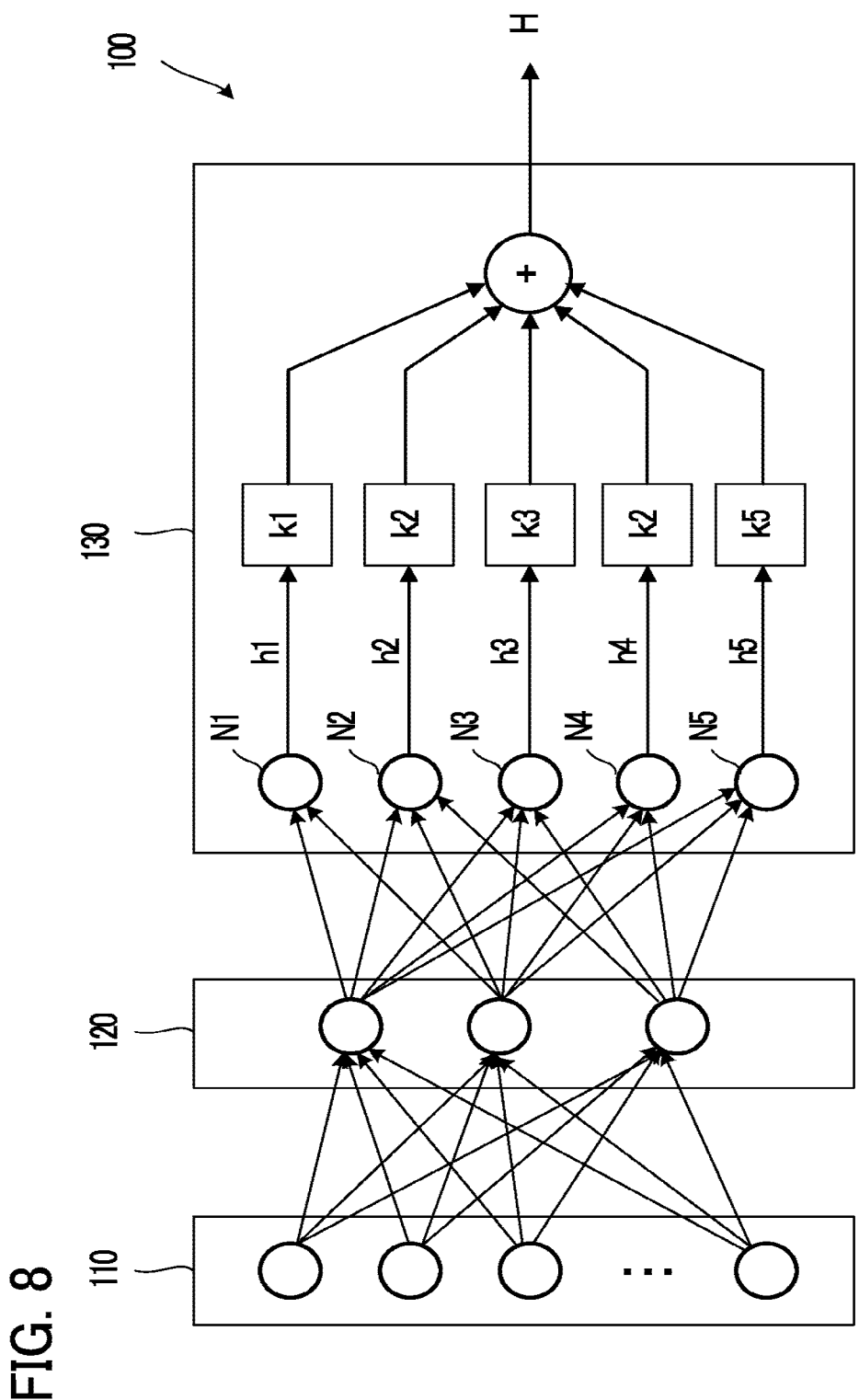
FIG. 8 is a schematic diagram illustrating a configuration example of a third trained model.

Each of the third trained models is configured with an artificial neural network, for example. Each of the third trained models may be configured with SVM, for example. FIG. 8 is a schematic diagram illustrating a configuration example of the third trained model. A third trained model 100 includes an input layer 110, an intermediate layer 120, and an output layer 130. In this example, the synthesized image SG includes five seams X12, X23, X34, X45, and X51 as illustrated in FIG. 4. Note that the number of seams is not limited to five seams. The seam X12 is a boundary between the first corrected image CG1 and the second corrected image CG2. The seam X23 is a boundary between the second corrected image CG2 and the third corrected image CG3. The seam X34 is a boundary between the third corrected image CG3 and the fourth corrected image CG4. The seam X45 is a boundary between the fourth corrected image CG4 and the fifth corrected image CG5. The seam X51 is a boundary between the fifth corrected image CG5 and the first corrected image CG1.

The output layer 130 includes five output nodes N1, N2, N3, N4, and N5 corresponding to the five seams X12, X23, X34, X45, and X51 on a one-to-one basis. The output node N1 outputs an individual assessment value h1 indicating the appropriateness of the seam X12. The output node N2 outputs an individual assessment value h2 indicating the appropriateness of the seam X23. The output node N3 outputs an individual assessment value h3 indicating the appropriateness of the seam X34. The output node N4 outputs an individual assessment value h4 indicating the appropriateness of the seam X45. The output node N5 outputs an individual assessment value h5 indicating the appropriateness of the seam X51. The output layer 130 holds five coefficients k1 to k5 corresponding to the five seams X12, X23, X34, X45, and X51 on a one-to-one basis. The output layer 130 multiplies the individual assessment values h1 to h5 by the coefficients k1 to k5, respectively. For example, for each of the seams, the output layer 130 multiplies the individual assessment value corresponding to the seam by the coefficient corresponding to the seam to generate multiplication results. The output layer 130 generates an assessment value H indicating the sum of the multiplication results.

The third correction data generator 25 generates pieces of third correction data based on the second correction data. For example, the third correction data generator 25 adds the second correction data to each of the random values differing from each other to generate the pieces of third correction data. As described above, the second correction data includes the parameters. To add the second correction data to each of the random values means to add each of the parameters included in the second correction data to each of the random values. The random values may be negative values.

The third correction data generator 25 may generate the pieces of third correction data by adding the second correction data to each of the prescribed values differing from each other.

The third correction data generator 25 may define the range of the random values from the minimum value to the maximum value based on classifications of imaging apparatuses from the first imaging apparatus C1 to the fifth imaging apparatus C5, based on classifications of lenses from the first lens L1 to the fifth lens L5, or based on the classifications of the image apparatuses from the first imaging apparatus C1 to the fifth imaging apparatus C5 and the classifications of the lenses from the first lens L1 to the fifth lens L5. The third correction data generator 25 may define the range of the prescribed values from the minimum value to the maximum value based on the classifications of the imaging apparatuses from the first imaging apparatus C1 to the fifth imaging apparatus C5, based on the classifications of the lenses from the first lens L1 to the fifth lens L5, or based on the classifications of the imaging apparatuses from the first imaging apparatus C1 to the fifth imaging apparatus C5 and the classifications of the lenses from the first lens L1 to the fifth lens L5. In these cases, the third correction data generator 25 generates the pieces of third correction data based on the classifications of the imaging apparatuses from the first imaging apparatus C1 to the fifth imaging apparatus C5, based on the classifications of the lenses from the first lens L1 to the fifth lens L5, or based on the classifications of the imaging apparatuses from the first imaging apparatus C1 to the fifth imaging apparatus C5 and the classifications of the lenses from the first lens L1 to the fifth lens L5. The second correction data is a parameter set for appropriately stitching the corrected images together in the synthesized image SG. Therefore, when the third correction data greatly deviates from the second correction data, there is a high probability that the stitching processing will fail. When the pieces of third correction data fall within a prescribed range from the second correction data, it is possible to reduce a decrease in the quality of the synthesized image SG.

The selector 26 includes the third trained model group M3. The selector 26 selects one third trained model corresponding to the category identified by the identifier 21 from among the third trained model group M3. The selector 26 acquires assessment values corresponding to the pieces of third correction data on a one-to-one basis by using the third trained model to which the coefficient K13 corresponding to the one third trained model from among the coefficients K13 is applied. For example, the selector 26 inputs each of the pieces of third correction data to the one third trained model along with the input images (the first input image to the fifth input image) to acquire the assessment values corresponding to the pieces of third correction data on a one-to-one basis. The selector 26 selects, from among the pieces of third correction data, one of the pieces of third correction data corresponding to the maximum assessment value among the assessment values.

When the determination result of the determiner 22 is negative, the image updater 24x causes the image stitching apparatus 10 to update the synthesized image SG based on the one of the pieces of third correction data selected by the selector 26. The image updater 24x outputs the synthesized image data indicating the updated synthesized image SG as the output image data Dout.

2-2. Operations of Image Processing Apparatus 1B

Next, operations of the image processing apparatus 1B will be described. The operations of the image processing apparatus 1B are the same as the flowchart of the image processing apparatus 1A illustrated in FIG. 6 except that the processor 20 executes update processing instead of step 7.

Figure 9:
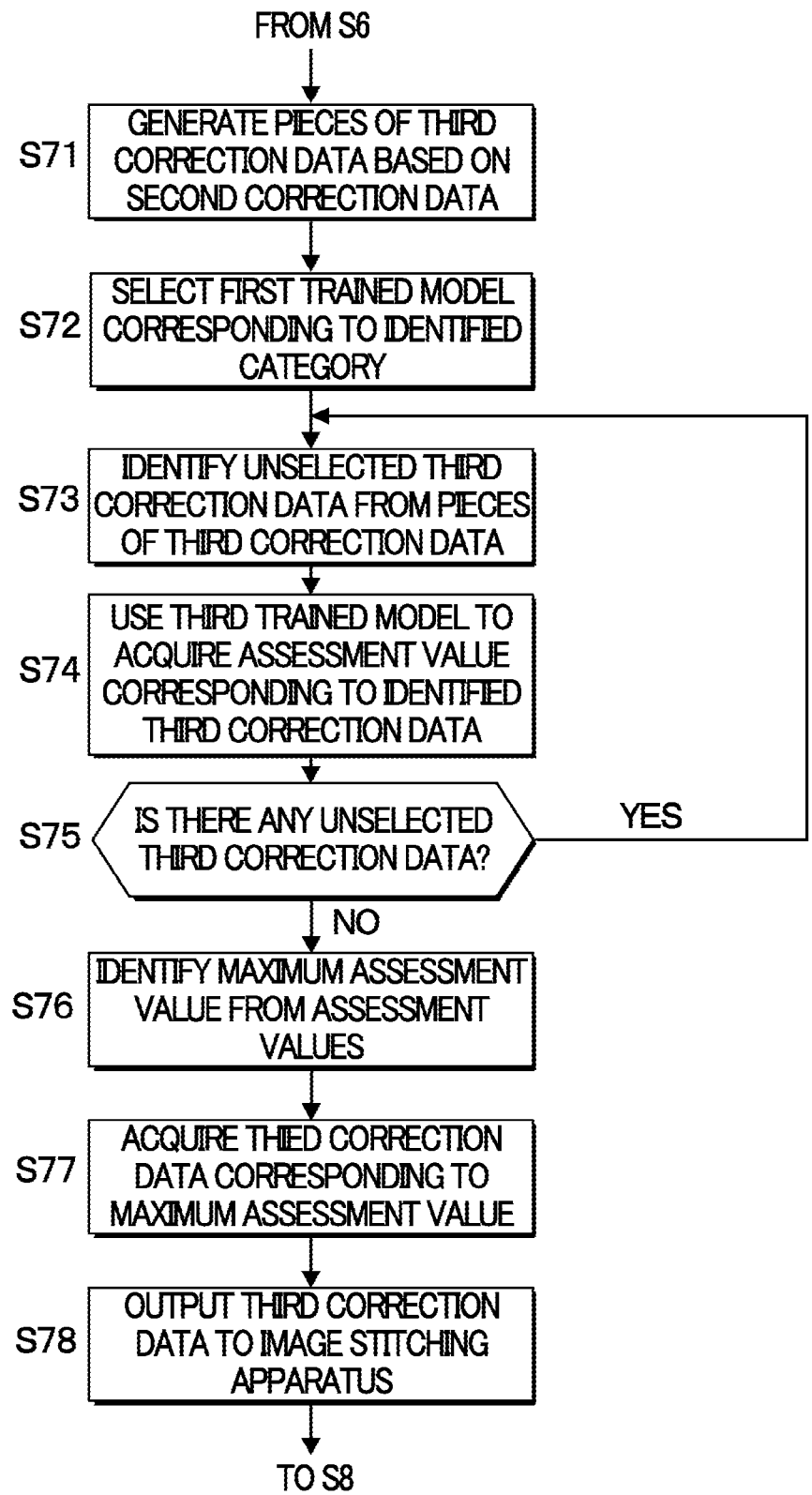
FIG. 9 is a flowchart illustrating content of update processing.

FIG. 9 is a flowchart illustrating the content of the update processing. At step S71, the processor 20 functions as the third correction data generator 25. The third correction data generator 25 generates the pieces of third correction data based on the second correction data. For example, a case is assumed in which the second correction data includes the parameter P11 and three pieces of third correction data are to be generated. The third correction data generator 25 generates random values RDN1, RDN2, and RDN3. The third correction data generator 25 adds the parameter P11 to the random value RDN1 to generate a parameter P111. The third correction data generator 25 adds the parameter P11 to the random value RDN2 to generate a parameter P112. The third correction data generator 25 adds the parameter P11 to the random value RDN3 to generate a parameter P113. The third correction data generator 25 generates the third correction data that includes the parameter P111, the third correction data that includes the parameter P112, and the third correction data that includes the parameter P113.

From step S72 to step S77, the processor 20 functions as the selector 26. First, the selector 26 selects the third trained model corresponding to the category identified at step S2 (referred to as "corresponding third trained model" hereinafter) from among the third trained model group M3 (step S72).

Next, the selector 26 identifies unselected third correction data from among the pieces of third correction data (step S73). Subsequently, the selector 26 uses the corresponding third trained model to acquire the assessment value corresponding to the identified third correction data. For example, the selector 26 first inputs the input images and the third correction data to the corresponding third trained model. Then, the selector 26 generates the assessment value based on the data output from the corresponding third trained model to which the input images and the third correction data are input.

Next, the selector 26 determines whether there is any unselected third correction data (step S75). When the determination result at step S75 is affirmative, the selector 26 returns the processing to step S73. On the other hand, when the determination result at step S75 is negative, the assessment values corresponding to the pieces of third correction data on a one-to-one basis are generated. Therefore, the selector 26 identifies the maximum assessment value from among the assessment values (step S76).

Next, the selector 26 identifies the third correction data corresponding to the maximum assessment value (referred to as "corresponding third correction data" hereinafter) from among the pieces of third correction data (step S77).

At step S78, the processor 20 functions as the image updater 24X. The image updater 24X outputs the third correction data (corresponding third correction data) identified at step S77 to the image stitching apparatus 10. As a result, the processor 20 is capable of causing the image stitching apparatus 10 to update the synthesized image SG based on the third correction data having the maximum assessment value.

As described above, the image processing apparatus 1B includes the third correction data generator 25, the selector 26, and the image updater 24x. The third correction data generator 25 generates the pieces of third correction data based on the second correction data. The selector 26 selects one third trained model corresponding to the category identified by the identifier 21 from among the third trained models which correspond to the categories on a one-to-one basis. The third trained models have each learned relationships between a set, which includes source images and correction data, and an assessment value indicating appropriateness of stitching of corrected images generated by correcting the source images included in the set using the correction data included in the set. The selector 26 inputs each of the pieces of third correction data to the one third trained model along with the input images to acquire the assessment values corresponding to the pieces of third correction data on a one-to-one basis. The selector 26 selects, from among the pieces of third correction data, one of the pieces of third correction data corresponding to the maximum assessment value among the assessment values. When the determination result of the determiner 22 is negative, the image updater 24x causes the image stitching apparatus 10 to update the synthesized image SG based on the one of the pieces of third correction data and outputs the synthesized image data indicating the updated synthesized image SG as the output image data Dout.

Accordingly, the image processing apparatus 1B generates the pieces of third correction data based on one of the pieces of second correction data. The image processing apparatus 1B identifies, from among the pieces of third correction data, the third correction data (corresponding third correction data) having the maximum assessment value that indicates appropriateness regarding stitching of the corrected images in the synthesized image SG. The image processing apparatus 1B is capable of updating the synthesized image SG by executing the stitching processing using the identified third correction data (corresponding third correction data). As a result, compared to a configuration that does not execute the stitching processing by using the third correction data having the maximum assessment value, the image processing apparatus 1B is capable of generating the synthesized image SG in which the corrected images are appropriately stitched together.

Furthermore, the third correction data generator 25 adds the second correction data to each of the random values differing from each other to generate the pieces of third correction data. Therefore, for each of the pieces of third correction data differing from each other generated based on the second correction data, the image processing apparatus 1B is capable of evaluating appropriateness of stitching of the corrected images generated by using the third correction data. As a result, accuracy of the stitching processing is improved.

3. Modifications

The present invention is not limited to the embodiments discussed above. Modes of specific modifications will be described hereinafter. Any two or more modes freely selected from the following modifications may be combined as well.

First Modification

As described above by referring to FIG. 8, each of the third trained models in the second embodiment is an artificial neural network that includes the input layer 110, the intermediate layer 120, and the output layer 130. The output layer 130 includes the output nodes N1 to N5 corresponding to the seams of the corrected images on a one-to-one basis. The output nodes N1 to N5 respectively output the individual assessment values h1 to h5 that indicate the appropriateness of the corresponding seams. The output layer 130 includes the coefficients k1 to k5 corresponding to the individual assessment values h1 to h5 on a one-to-one basis. The output layer 130 multiplies each of the individual assessment values h1 to h5 by the corresponding coefficient among the coefficients k1 to k5. The output layer 130 adds up the multiplication results to output the assessment value H.

The processor 20 may adjust the coefficients k1 to k5 in accordance with the importance of the seams designated by the user. For example, when the importance of the seam X34 in the synthesized image SG illustrated in FIG. 4 is higher than the importance of the seam X51, the coefficient k3 corresponding to the seam X34 may increase and the coefficient k5 corresponding to the seam X51 may decrease. Even in a case of a 360-degree synthesized image SG, the importance of the area assumed to be focused on by the user is higher than the importance of the other areas. When the synthesized image SG includes the area of higher importance and the area of lower importance as in the case described above, high accuracy is required for stitching the corrected images in the area of higher importance while high accuracy is not required for stitching the corrected images in the area of lower importance. Therefore, the processor 20 adjusts the coefficients k1 to k5 in accordance with the importance of the seams designated by the user. In this case, the processor 20 can increase the accuracy of stitching in the area of higher importance than the accuracy of stitching in the area of lower importance.

Second Modification

In each of the embodiments described above, the coefficients K11 that define the first trained model group M1, the coefficients K12 that define the second trained model group M2, the coefficients K13 that define the third trained model group M3, and the coefficients K1C that define the category trained model MC are stored in the storage device 50. However, those coefficients may be stored in an external apparatus. In this case, the image processing apparatus 1A or 1B includes a communicator that is capable of communicating with the external apparatus via the network. The image processing apparatus 1A or 1B acquire the coefficients K11 that define the first trained model group M1, the coefficients K12 that define the second trained model group M2, the coefficients K13 that define the third trained model group M3, and the coefficients K1C that define the category trained model MC from the external apparatus via the communicator.

Third Modification

Figure 10:
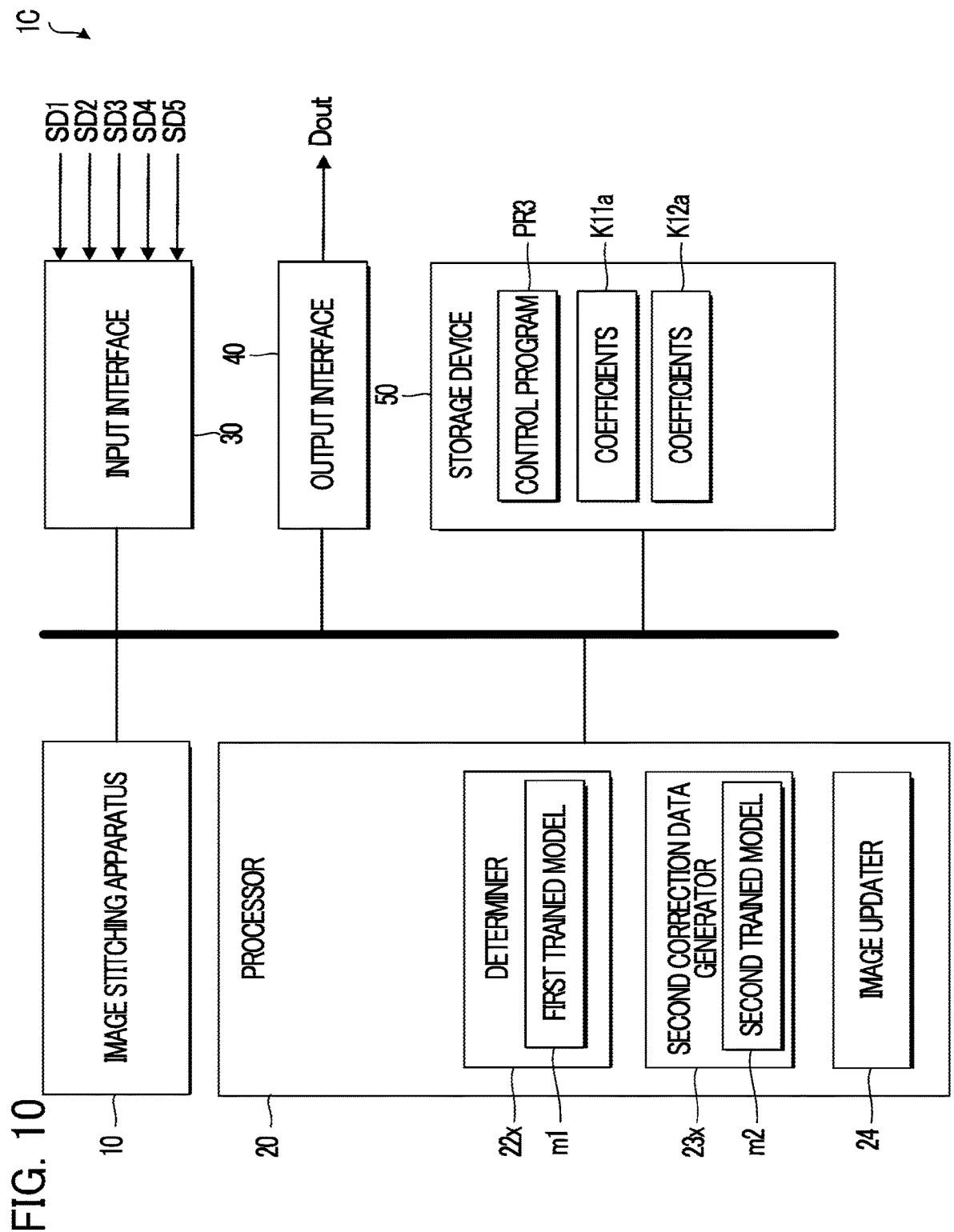
FIG. 10 is a block diagram illustrating a configuration example of an image processing apparatus 1C.

While the image processing apparatus 1A in the first embodiment described above includes the identifier 21 that identifies the category corresponding to the type of the content of the synthesized image SG, the present disclosure is not limited thereto. FIG. 10 is a block diagram illustrating a configuration of an image processing apparatus 1C according to a third modification.

The image processing apparatus 1C is different from the image processing apparatus 1A of the first embodiment illustrated in FIG. 3 in following aspects: the identifier 21 and the category trained model MC are not included; a control program PR3 is used instead of the control program PR1; a first trained model m1 is used instead of the first trained model group M1; coefficients K11a that define the first trained model m1 are stored in the storage device 50 instead of the coefficients K11 that define the first trained model group M1; a second trained model m2 is used instead of the second trained model group M2; coefficients K12a that define the second trained model m2 are stored in the storage device 50 instead of the coefficients K12 that define the second trained model group M2; a determiner 22x is used instead of the determiner 22; and a second correction data generator 23x is used instead of the second correction data generator 23.

The first trained model m1 has learned whether images are appropriately stitched together in an image by machine learning using fourth training data T4. The learning result of the first trained model m1 is reflected on the coefficients K11a that define the first trained model m1. The fourth training data T4 includes a set of fourth input data T4a and fourth label data T4b. The fourth input data T4a is composite image data that indicates a composite image in which images are stitched together. The fourth label data T4b indicates whether the images are appropriately stitched together in the composite image indicated in the fourth input data T4a. The first trained model m1 has learned pieces of fourth training data T4 different from each other, that is, a fourth training data set, in a learning phase. There is no specific category set for the fourth training data T4. Therefore, the first trained model m1 corresponds to all categories. As a result, there are more pieces of fourth training data T4 than the pieces of the first training data T1 required for a single first trained model in the first trained model group M1 described above.

The second trained model m2 has learned third image correction data by machine learning using fifth training data T5. The third image correction data is used in correction processing for correcting images (source images) that are the sources of corrected images to be stitched together into corrected images suited to be stitched together. The learning result of the second trained model m2 is reflected on the coefficients K12a that define the second trained model m2. The fifth training data T5 includes a set of fifth input data T5a and fifth label data T5b. The fifth input data T5a includes pieces of image data. The pieces of image data indicate source images. The fifth label data T5b is the third image correction data (correction data). When the pieces of image data are input to the second trained model m2, the second trained model m2 outputs the third image correction data (for example, second correction data). The second trained model m2 has learned pieces of fifth training data T5 different from each other, that is, a fifth training data set, in a learning phase. There is no specific category set for the fifth training data T5. Therefore, the second trained model m2 corresponds to all categories. As a result, there are more pieces of fifth training data T5 than pieces of the second training data T2 required for a single second trained model in the second trained model group M2 described above.

The processor 20 reads out the control program PR3 from the storage device 50. The processor 20 functions as the determiner 22x, the second correction data generator 23x, and the image updater 24 by executing the control program PR2.

The determiner 22x includes the first trained model m1 to which the coefficients K11a are applied. The determiner 22x uses the first trained model m1 to determine whether the corrected images are appropriately stitched together in the synthesized image SG. In the use of such a determination method, the determiner 22x is different from the determiner 22 that determines whether the corrected images are appropriately stitched together in the synthesized image SG by using the first trained model corresponding to the category of the synthesized image SG from among the first trained model group M1.

The second correction data generator 23x includes the second trained model m2 to which the coefficients K12a are applied. The second correction data generator 23x uses the second trained model m2 to generate the second correction data corresponding to the pieces of image data SD1 to SD5. In the use of such a generation method, the second correction data generator 23x is different from the second correction data generator 23 that generates the second correction data corresponding to the pieces of image data SD1 to SD5 by using the second trained model corresponding to the category of the synthesized image SG from among the second trained model group M2.

With the image processing apparatus 1C, it is possible to omit the identifier 21. The image processing apparatus 1C is capable of executing the stitching processing by using a single first trained model m1 and a single second trained model m2. Therefore, it is possible to generate a natural synthesized image SG while simplifying the configuration.

Fourth Modification

Figure 11:
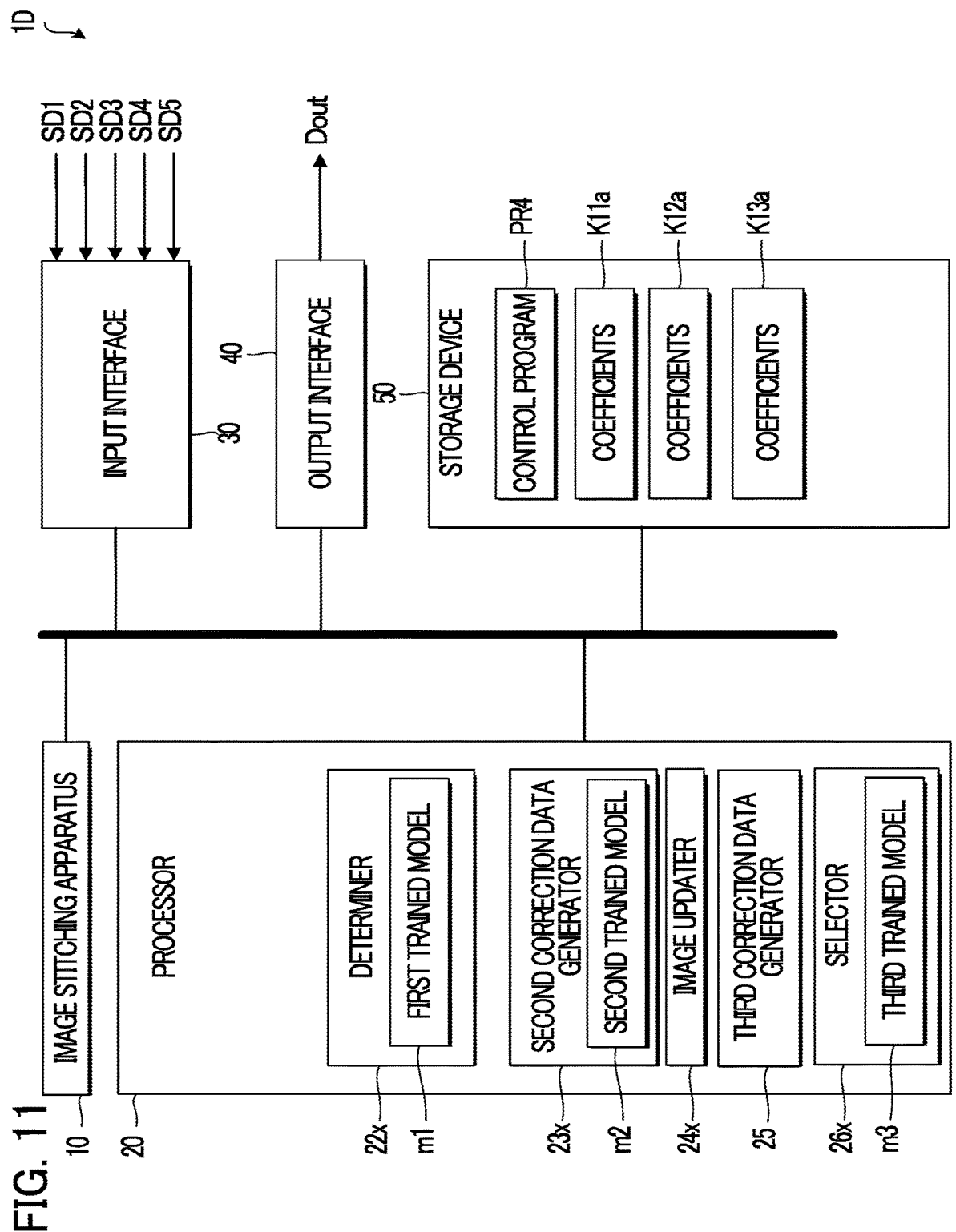
FIG. 11 is a block diagram illustrating a configuration example of an image processing apparatus 1D.

While the image processing apparatus 1B in the second embodiment described above includes the identifier 21 that identifies the category corresponding to the type of the content of the synthesized image SG, the present disclosure is not limited thereto. FIG. 11 is a block diagram illustrating a configuration of an image processing apparatus 1D according to a fourth modification.

The image processing apparatus 1D is different from the image processing apparatus 1B of the second embodiment illustrated in FIG. 7 in following aspects: the identifier 21, the selector 26, and the category trained model MC are not included; a control program PR4 is used instead of the control program PR3; the first trained model m1 is used instead of the first trained model group M1; the coefficients K11a that define the first trained model m1 are stored in the storage device 50 instead of the coefficients K11 that define the first trained model group M1; the second trained model m2 is used instead of the second trained model group M2; the coefficients K12a that define the second trained model m2 are stored in the storage device 50 instead of the coefficients K12 that define the second trained model group M2; a third trained model m3 is used instead of the third trained model group M3; coefficients K13a that define the third trained model m3 are stored in the storage device 50 instead of the coefficients K13 that define the third trained model group M3; the determiner 22x is used instead of the determiner 22; the second correction data generator 23x is used instead of the second correction data generator 23; and a selector 26x is used instead of the selector 26.

The first trained model m1, the second trained model m2, the determiner 22x, and the second correction data generator 23x are described in the third modification above.

The third trained model m3 has learned relationships between fourth image correction data and an assessment value indicating appropriateness of stitching of the images generated by the correction processing using the fourth image correction data by machine learning using sixth training data T6. For example, the third trained model m3 has learned relationships between a set, which includes source images and the fourth image correction data, and the assessment value indicating appropriateness of stitching of the corrected images generated by correcting the source images using the fourth image correction data. The learning result of the third trained model m3 is reflected on the coefficients K13a that define the third trained model m3. The sixth training data T6 includes a set of sixth input data T6a and sixth label data T6b. The sixth input data T6a is a set of images (source images), which are the sources of corrected images to be stitched together, and the fourth image correction data (correction data). The fourth image correction data is used in the correction processing for correcting the source images into the corrected images suited for being stitched together. The sixth label data T6b indicates the assessment value for the fourth image correction data. The assessment value indicates the appropriateness of stitching of the corrected images. When the source images (for example, input images) and the fourth image correction data are input to the third trained model m3, the third trained model m3 outputs the assessment value. The third trained model m3 has learned pieces of sixth training data T6 different from each other, that is, a sixth training data set, in a learning phase. There is no specific category set for the sixth training data T6. Therefore, the third trained model m3 corresponds to all categories. As a result, there are more pieces of sixth training data T6 than the pieces of the third training data T3 required for a single third trained model in the third trained model group M3 described above.

The processor 20 reads out the control program PR4 from the storage device 50. The processor 20 functions as the determiner 22x, the second correction data generator 23x, the image updater 24x, the third correction data generator 25, and the selector 26x by executing the control program PR4.

The selector 26x includes the third trained model m3 to which the coefficients K13a are applied. The selector 26x uses the third trained model m3 to acquire assessment values corresponding to the pieces of third correction data on a one-to-one basis. In the use of such an acquisition method, the selector 26x is different from the selector 26 that acquires the assessment values corresponding to the pieces of third correction data on a one-to-one basis by using the third trained model corresponding to the category of the synthesized image SG from among the third trained model group M3.

The third correction data generator 25 generates the pieces of third correction data based on the second correction data. The selector 26x acquires the assessment values corresponding to the pieces of third correction data on a one-to-one basis by inputting each of the pieces of third correction data along with the input images to the third trained model m3 that has learned the relationships between a set, which includes the source images and the correction data, and the assessment value. The selector 26x selects, from among the pieces of third correction data, one piece of third correction data corresponding to the maximum assessment value from among the acquired assessment values. When the determination result of the determiner 22x is negative, the image updater 24x causes the image stitching apparatus 10 to update the synthesized image SG based on the one piece of third correction data instead of the second correction data. The image updater 24x outputs the synthesized image data indicating the updated synthesized image SG as the output image data Dout.

With the image processing apparatus 1D, it is possible to omit the identifier 21. The image processing apparatus 1D is capable of executing the stitching processing by using a single first trained model m1, a single second trained model m2, and a single third trained model m3. Therefore, it is possible to generate a natural synthesized image SG while simplifying the configuration.

4. Other Matters (1) In the foregoing embodiments, the storage device 50 may include a flexible disk, a magnetooptical disk (e.g., a compact disk, a digital versatile disk, or a Blu-ray (registered trademark) disk), a smart card, a flash memory device (e.g., a card, a stick, or a key drive), a CD-ROM (Compact Disc-ROM), a register, a removable disk, a hard disk, a floppy (registered trademark) disk, a magnetic strip, a database, a server, or other suitable recording media. The program may be transmitted from a network via a telecommunication line.

(2) The information and signals described in the foregoing embodiments may be expressed by any one of various techniques. For example, data, instructions, commands, information, signals, bits, symbols, and chips that can be mentioned in the overall description may be expressed by a voltage, a current, an electromagnetic wave, a magnetic field or magnetic particles, an optical field or a photon, or any combination thereof.

(3) In the foregoing embodiments, input and output information or the like may be stored in a specific location (e.g., a memory) or a management table. The input and output information can be overwritten, updated, or written with additional information. The output information may be deleted. The input information may be transmitted to another apparatus.

(4) In the foregoing embodiments, the determination may be performed by a value (0 or 1) expressed as 1 bit, a Boolean value (true or false), or a comparison between numeric values (for example, a comparison with a predetermined value).

(5) In the procedures, sequences, and flowcharts of the embodiments, the order may be changed, unless a conflict arises. For example, the method described in the present specification presents various step elements in an exemplary order but is not limited to the presented specific order.

(6) Each function described in FIGS. 3 and 7 is implemented by any combination of hardware and/or software. Moreover, a way to implement each functional block is not particularly limited. Specifically, each functional block may be implemented by a physically or logically coupled apparatus or by two or more physically or logically separated apparatuses that are direct or indirect (e.g., wired and/or wireless) coupled to each other. The functional block may be implemented by combining software with one or more apparatuses described above.

(7) The programs described in the embodiments should be widely interpreted as commands, command sets, codes, code segments, program codes, programs, subprograms, software modules, applications, software applications, software packages, routines, subroutines, objects, executable files, executive threads, procedures, or functions regardless of whether the programs are to be denoted as software, firmware, middleware, microcodes or hardware description languages, or other names.

Software, commands, and information may be transmitted and received via a transmission medium. For example, when software is transmitted from a website, a server, or other remote sources by using at least one of wired technology with a coaxial cable, an optical fiber cable, a twisted pair cable, and a digital subscriber line (DSL) or the like and wireless technology with infrared rays and microwaves or the like, the definition of a transmission medium includes the at least one of the wired technology and wireless technology.

(8) In the foregoing embodiments, terms "connected" and "coupled" or any modifications thereof mean any direct or indirect connection or coupling between two or more elements and can include the presence of one or more intermediate elements between two "connected" or "coupled" elements. A logical connection, a physical connection, or a combination thereof may be made between elements. For example, "connection" may be replaced by "access". In the use of the present specification, it can be assumed that two elements are "connected" or "coupled" to each other by using at least one of one or more electric wires and cables and printed electrical connection and by using, as some unrestricted and noncomprehensive examples, electromagnetic energy having wavelengths of a radio frequency range, a microwave range, and an optical (visible and invisible) range.

(9) In the foregoing embodiments, "based on" does not mean "only based on" unless otherwise specified. In other words, "based on" means both "only based on" and "at least based on."

(10) In the foregoing embodiments, "including", "comprising", and modifications thereof are intended to be generic like "comprising" when these terms are used. Furthermore, the term "or" used in the present disclosure is not intended to be the exclusive OR.

(11) In the disclosure, for example, when articles such as "a", "an", and "the" in English are added in translation, the disclosure includes the nouns following these articles being plural.

(12) In the disclosure, the term "A and B are different" may mean that A and B are different from each other. The term may mean that "A and B are each different from C". Terms such as "away" and "combined" may be interpreted in the same way as "different.

(13) Each of the modes/embodiments described in this disclosure may be used alone, in combination, or switched as they are implemented. The notification of predetermined information (e.g., notification of "being X") is not limited to being explicit, and it may also be implicit (e.g., by not notifying of the said predetermined information).

Although the present disclosure has been described in detail above, it is clear to those skilled in the art that the present disclosure is not limited to the embodiments described in the present disclosure. The present disclosure may be implemented in modified and altered forms without departing from the intent and scope of the present disclosure as defined by the claims. Therefore, the description of this disclosure is for illustrative purposes only and is not meant to be in any way limiting to this disclosure.

DESCRIPTION OF REFERENCE SIGNS 1A, 1B . . . processing apparatus, 10 . . . Image stitching apparatus, 20 . . . Processor, 21 . . . Identifier, 22 . . . Determiner, 23 . . . Second correction data generator, 24, 24x . . . Image updater, 25 . . . Third correction data generator, 26 . . . Selector, 100 . . . Third trained model, 110 . . . Input layer, 120 . . . Intermediate layer, 130 . . . Output layer, M1 . . . First trained model group, M2 . . . Second trained model group, M3 . . . Third trained model group, MC . . . Category trained model, m1 . . . First trained model, m2 . . . Second trained model, m3 . . . Third trained model.

The invention claimed is:

1. An image processing apparatus comprising:
processing circuitry configured to
correct input images based on first correction data to generate corrected images, and generate a synthesized image by stitching corrected images together;
determine, as a determination result, whether the corrected images are appropriately stitched together in the synthesized image by using a first trained model having learned whether images are appropriately stitched together in an image in which the images are stitched together;
generate second correction data by supplying the input images to a second trained model having learned relationships between correction data used to correct source images to generate corrected images that are appropriately stitched together and the source images; and
output the synthesized image when the determination result is affirmative and output an updated synthesized image generated by causing the processing circuitry to update the synthesized image based on the second correction data when the determination result is negative; generate pieces of third correction data based on the second correction data;
acquire assessment values corresponding to the pieces of third correction data on a one-to-one basis by supplying each of the pieces of third correction data along with the input images to a third trained model having learned relationships between a set, which includes source images and correction data, and an assessment value indicating appropriateness of stitching of corrected images generated by correcting the source images included in the set using the correction data included in the set; and
select one of the pieces of third correction data corresponding to a maximum assessment value among the assessment values, wherein the processing circuitry is configured to output the updated synthesized image obtained by causing the processing circuitry to generate the updated synthesized image based on the one of the pieces of third correction data when the determination result is negative.

2. An image processing apparatus comprising:
processing circuitry configured to
correct input images based on first correction data to generate corrected images, and generate a synthesized image by stitching corrected images together;
determine, as a determination result, whether the corrected images are appropriately stitched together in the synthesized image by using a first trained model having learned whether images are appropriately stitched together in an image in which the images are stitched together;
generate second correction data by supplying the input images to a second trained model having learned relationships between correction data used to correct source images to generate corrected images that are appropriately stitched together and the source images; and output the synthesized image when the determination result is affirmative and output an updated synthesized image generated by causing the processing circuitry to update the synthesized image based on the second correction data when the determination result is negative;

identify a category corresponding to a type of content of the synthesized image from categories regarding types of content of images, select, from first trained models corresponding to the categories on a one-to-one basis and having learned whether images are appropriately stitched together in an image, one of the first trained models corresponding to the category identified by the processing circuitry; and determine whether the corrected images are appropriately stitched together in the synthesized image by using the one of the first trained models, select, from second trained models corresponding to the categories on a one-to-one basis and having learned the relationships between the source images and the correction data, one of the second trained models corresponding to the category identified by the processing circuitry; and generate the second correction data by supplying the input images to the one of the second trained models.

3. The image processing apparatus according to claim 2, wherein the processing circuitry is configured to generate pieces of third correction data based on the second correction data; and select, from third trained models corresponding to the categories on a one-to-one basis and having learned relationships between a set, which includes source images and correction data, and an assessment value indicating appropriateness of stitching of corrected images generated by correcting the source images included in the set using the correction data included in the set, one of the third trained models corresponding to the category identified by the processing circuitry; acquire assessment values corresponding to the pieces of third correction data on a one-to-one basis by supplying each of the pieces of third correction data along with the input images to the one of the third trained models; and select a one of the pieces of third correction data corresponding to a maximum assessment value among the assessment values, wherein the processing circuitry is configured to output the updated synthesized image obtained by causing the processing circuitry to generate the updated synthesized image based on the one of the pieces of third correction data when the determination result is negative.

4. The image processing apparatus according to claim 1, wherein the processing circuitry is configured to generate the pieces of third correction data by adding the second correction data to random values that are different from each other.

5. The image processing apparatus according to claim 1, wherein the input images are generated by imaging apparatuses that are different from each other, and the processing circuitry is configured to generate the pieces of third correction data based on classifications of the imaging apparatuses, based on classifications of lenses used in each of the imaging apparatuses, or based on the classifications of the imaging apparatuses and the classifications of the lenses.

6. The image processing apparatus according to claim 1, wherein the third trained model is an artificial neural network including an input layer, an intermediate layer, and an output layer, the image generated by stitching together the corrected images generated by the correction includes seams, the output layer includes output nodes corresponding to the seams on a one-to-one basis, the output nodes output individual assessment values corresponding to the seams on a one-to-one basis, each of the individual assessment values indicates appropriateness of a corresponding seam, the output layer is configured to:
  hold coefficients corresponding to the seams on a one-to-one basis;
  multiply, for each of the seams, the individual assessment value corresponding to the seam by the coefficient corresponding to the seam to generate multiplication results; and
  add up the multiplication results to output the assessment value, and the coefficients are adjusted in accordance with importance of the seams designated by a user.

7. The image processing apparatus according to claim 2, wherein the processing circuitry is configured to identify the category corresponding to the type of the synthesized image among the categories by using a fourth trained model having learned relationships between images and the categories.

* * * * *